May 24, 1960 M. GARBUNY ET AL 2,938,141

PHOTOTHERMIONIC IMAGE CONVERTER WITH RETARDING FIELDS

Filed July 21, 1953

WITNESSES:
E. A. McCloskey
Charles F. Renz

INVENTORS
Max Garbuny and
William E. Horn.
BY
F. E. Browder
ATTORNEY 2,938,141

PHOTOTHERMIONIC IMAGE CONVERTER WITH RETARDING FIELDS

Max Garbuny and William E. Horn, Pittsburgh, Pa., assignors to Westinghouse Electric Corporation, East Pittsburgh, Pa., a corporation of Pennsylvania Filed July 21, 1953, Ser. No. 369,266

21 Claims. (Cl. 315—11)

Our invention relates to image converters and in particular relates to devices for rendering infrared radiation images visible to the eye. To mention one specific field in which such converters are useful, any object emits, according to its temperature and surface emissivity, thermal radiation which is invisible to the unaided human eye and visible only to a person provided with the infrared image converter to which our invention relates. The general principle on which our device operates is by focusing an image of the infrared radiation field, emitted by the object being pictured, upon a very thin screen of material, the photoelectric emissivity of which varies with temperature, and scanning this screen point-by-point with a fine light beam. The electron emission, varying from instant to instant as the scanning beam traverses the screen, is collected and sent through a suitable channel to a kinescope on the output screen of which it evokes a light picture in the same way that the modulated output current of a television pickup tube produces a picture on the receiving kinescope screen. Our image converter may, in fact, be thought of, in one of its aspects, as an infrared television apparatus.

In the copending application Serial No. 304,502 of Max Garbuny, filed on August 15, 1952, for Photothermionic Image Converter and assigned to the present assignee, there is described an infrared image converter in which the present application constitutes an improvement.

The electrons which surround the ions in any solid are known to be held at different energy levels from which they may be dislodged in the process of photoelectric emission only by photons having wavelengths smaller than the critical values corresponding respectively to the respective energy levels. The higher of these energy levels may be populated with electrons only by thermal activation. The higher the temperature, the more electrons are in these higher levels. Therefore, the electron emission from the higher of these energy levels varies with temperature, but emissivity from lower levels is substantially independent of temperature. Since infrared image converters depend for operation only on photo-emissivity which varies with temperature, the image converter described in the above-numbered application employed a scanning beam of light in the red regions of the spectrum which consists of longer wave photons of energy insufficient to eject electrons from energy levels not sensitive to temperature. This scanning beam was produced by focussing on the above-mentioned thin screen the image of a light spot traversing the output screen of an auxiliary kinescope composed of red-emitting phosphors. The number of red-emitting phosphors is, however, rather limited, and certain of their ancillary characteristics, such as time constants, are not of magnitudes desirable for all purposes.

In accordance with our present invention, we provide a method by which light beams of any color may be used to scan the thin photo-emissive screen, thereby greatly extending the list of phosphors available for the screen of the ancillary kinescope, while limiting the current in the output channel to electrons emanating from temperature-sensitive energy levels of the screen. This result we achieve by providing a retarding gradient between the emissive screen and the collector electrode which filters out all electrons except those derived from the temperature-sensitive high energy levels in the screen. Moreover, the efficiency in inducing emission of the high-level electrons proves in many cases to be substantially greater in the case of high energy photons than in the case of the red light photons previously used so that the yield of temperature-sensitive electrons is much improved by use of the shorter wave scanning beam. This in turn makes it possible to use, if desired, emissive screen materials and conditions which sacrifice mere electron yield to high temperature sensitivity with resulting improvement of picture production.

One object of our invention is accordingly to provide an improved system for making visible images from infrared radiation.

Another object is to provide an improved type of converter for thermal images.

Another object is to provide an improved arrangement for exploring and registering the temperature distribution over surfaces.

Another object is to provide a more efficient arrangement for effecting emission of the electrons from temperature-sensitive levels of solids.

Another object is to provide an improved arrangement for producing an electric current due solely to electrons emitted from high energy levels of solids.

Still another object is to provide a method of employing fast, efficient phosphors as light sources and of discriminating in the resulting photo current against all but the part originating in temperature sensitive energy levels of the solid.

Yet another object is to provide an improved arrangement for measuring and registering the electron population of the high energy stages in atoms.

Other objects of our invention will become evident upon reading the following description taken in connection with the drawings, in which.

Figure 1:
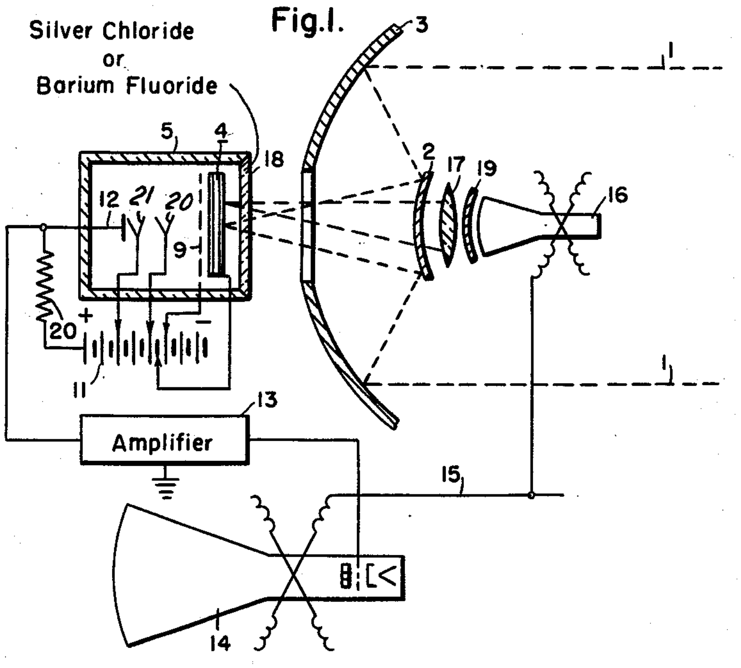
Figure 1 is a schematic drawing, partly in section, illustrating an image converter embodying the principles of our invention.

Referring in detail to Fig. 1, the infrared radiation 1 emanating from the object to be depicted is focussed by a suitable optical system, which may, for example, comprise mirrors 2 and 3, on the electron-emitting screen 4 of the image converter tube 5 which embodies the principles of our invention. The screen 4 may consist of three layers 6, 7 and 8 shown to larger scale in Fig. 2. The first layer 6 met by the focussed image may be of gold-black or other good absorber of infrared rays, having a thickness of the order of $4\times10^{-6}$ cm. The layer 6 is superposed on a layer 7 of some suitable support material, such as silicon monoxide, which may be about $2\times10^{-5}$ cm. thick and which may be further supported by a thin wire screen or the like. A layer 8 may be coated on layer 7, layer 8 consisting of a photosensitive material, such as cesium antimony, having a high temperature coefficient of photoemission. Other arrangements of the absorbing, supporting and photosensitive layers are of course possible. Slightly spaced from layer 8 is a screen or grid 9 which is preferably of a metal such as tungsten having low secondary electron emissivity and which is provided with an inlead through the wall of tube 5 by which a retarding potential for electrons emitted from the surface 8 may be impressed by a voltage supply 11. A collector electrode 12 is connected through a resistor 20 to the positive pole of source 11, and is also connected through a suitable amplifier 13 to the control grid of a conventional kinescope 14 fed with scanning voltage from a lead 15. Collector 12 may be a signal plate, or preferably, an electron multiplier. We show, however, with means 12 schematically only a signal plate. The numerals 20 and 21 represent suitable dynodes of an electron multiplier.

A cathode ray tube 16 having a scanning beam synchronized from lead 15 and having an output screen traversed point-by-point with a light spot is positioned so that an image of that spot is focussed by an optical system indicated by 17 on the screen 4 through a semitransparent mirror 2. As the cathode ray beam in cathode ray tube 16 scans its phosphor output screen, the focussed image of the light spot it produces similarly traverses the screen 4 point-by-point causing emission of electrons from the surface of the layer 8. The phosphor on the screen of cathode ray tube 16 is of a type which emits blue or green light or near ultraviolet of a wavelength less than 6800 Angstroms and may have a decay time to $1/e$ of the initial spot intensity in less than $10^{-6}$ seconds. Correspondingly, a sealed window 18 will allow both visible or near ultraviolet and infrared radiation up to 14 microns to pass through. Window 18 may consist of silver chloride or, alternatively, barium fluoride or yet other wide band transmitting materials. A filter 19 may be inserted into the path of the scanning light, e.g. between auxiliary scanning tube 16 and lens system 17, to stop undesired light wave lengths.

Photons of energy corresponding to the transmitted color will be incident upon the atoms in the surafce layer 8 of screen 4. Electrons having energy levels of such high values as to be temperature-sensitive and others of value too low to be temperature-sensitive will both be emitted from such atoms by photons of green or blue wavelength, but the energy after emerging from the surface of the first group will be distinctly higher than the similar energy of the second group. By adjusting the electrical potential of the grid 9 to the proper value relative to screen 4, the non-temperature sensitive electrons of low emergent energy will be effectively prevented from passing through grid 9 while the electrons emanating from energy levels high enough to have a substantial temperature coefficient of emissivity will pass grid 9 and be collected by collector electrode 12 or, if an electron multiplier is used in conjunction with collector 12, they will impinge on the first dynode 20 of the multiplier system. Thus, as the light spot scans screen 4, the number of electrons arriving at collector 12 will vary in correspondence with the varying temperature of the successive elements of surface of layer 8 on which the light spot is incident, and the voltage impressed from amplifier 13 on the control electrode of kinescope 14 will vary in correspondence with that temperature. In short, the light image on the output screen of kinescope 14 will map the temperature distribution on screen 4, and so be a replica of the temperature distribution on a pictured surface from which the infrared radiation 1 is focussed on screen 4. The image on the screen of kinescope 14 is thus also a map of the infrared radiation distribution in the cross section of that radiation field.

Figure 2:
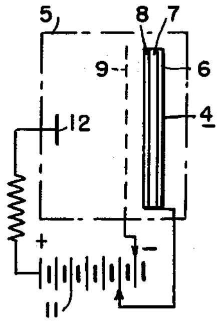
Fig. 2 is a similar view illustrating the electron-emitting screen to larger scale.
Figure 3:
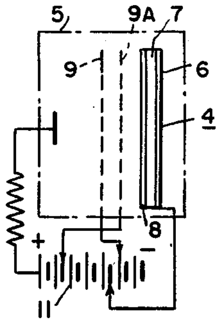
Fig. 3 is a view similar to Fig. 2 of a modification of our invention.

Fig. 3 shows an arrangement which differs from that of Figs. 1 and 2 in that a second grid 9A is provided between the retarding grid 9 and screen 4, and maintained at a positive potential relative to the latter. The grid 9A will first accelerate and focus all electrons emanating from layer 8. Grid 9, which is slightly negative with respect to layer 8, will allow only the high energetic electrons to pass to collector 12, the others being returned to grid 9A. This arrangement allows for better focussing.

While we have mentioned cesiated antimony as a desirable material for the photoelectrically-emissive surface, it will be recognized that other photoelectrically-emissive materials are within contemplation of our invention, including semiconductors as well as metals, and that the use of short-wavelength light will be found advantageous in some of these cases since the screen is extremely efficient in utilizing the light energy.

We claim as our invention:

1. An image converter comprising a screen on which a radiation image is focussed, said screen having a photoelectrically-emissive surface layer, a support for said layer, a collector electrode facing said layer, an electron multiplier receiving secondary electrons from said collector electrode, a grid electrode between said layer and said collector electrode, and means to scan said layer with a beam of photon energy great enough to produce electron emission from energy levels which are temperature insensitive.

2. An image converter comprising a screen on which a radiation image is focussed, said screen having a photoelectrically-emissive surface layer, a support for said layer, a collector electrode facing said layer, a grid electrode between said layer and said collector electrode, and means to scan said layer with a beam of photon energy great enough to produce electron emission from energy levels which are temperature insensitive.

3. An image converter comprising a screen on which a radiation image is focussed, said screen having a cesium antimony layer, a support for said layer, an electron multiplier facing said layer, a grid electrode between said layer and said electron multiplier and means to scan said layer with a beam of wavelength less than 6800 Angstroms.

4. An image converter comprising a screen on which a radiation image is focussed, said screen having a photoelectrically-emissive surface layer, a support for said layer, a collector electrode facing said layer, two control electrodes between said layer and said collector electrode and means to scan said layer with a beam of photon energy great enough to produce electron emission from energy levels which are temperature-insensitive.

5. An image converter comprising a screen on which a radiation image is focussed, said screen having a photoelectrically-emissive surface, a support for said surface, a collector electrode facing said surface, a control electrode between said surface and said collector electrode, a kinescope, said kinescope having a decay time to $1/e$ of the initial spot intensity in less than $10^{-6}$ seconds, means of optically filtering the light from said kinescope so as to define the upper and lower limit of the transmitted scanning wavelength region, means of imaging the light spot of said kinescope on said surface, means of imaging the thermal radiation originating from an observed object onto said screen and a window transparent to said transmitted scanning wavelength region and to said thermal radiation, said window being sealed vacuum tight to the envelope of said image converter.

6. An image converter comprising a screen on which a radiation image is focussed, said screen having a photoelectrically-emissive surface, a support for said surface, a first control electrode facing said surface, a second control electrode closely adjacent to said first control electrode, said first and second control electrodes consisting of fine wire mesh, means to supply an accelerating voltage to said first control electrode, means for supplying a retarding voltage to said second control electrode, a collector electrode facing said second control electrode, a kinescope, said kinescope having a decay time to $1/e$ of the initial spot intensity in less than $10^{-6}$ seconds, means of optically filtering the light from said kinescope so as to define the upper and lower limit of the transmitted scanning wavelength region, means of imaging the light spot of said kinescope on said surface, means of imaging the thermal radiation originating from an observed object onto said screen and a window transparent to said transmitted scanning wavelength region and to said thermal radiation, said window being sealed vacuum tight to the envelope of said image converter.

7. An image converter comprising a screen on which a radiation image is focussed, said screen having a photoelectrically-emissive surface of cesiated antimony, a support for said cesiated antimony, a collector electrode facing said surface, a control electrode between said surface and said collector electrode, and means to scan said cesiated antimony with a spot of light having a wavelength less than 6800 Angstroms.

8. An image converter comprising a screen on which a radiation image is focussed, said screen having a photoelectrically-emissive surface layer, a support for said layer, a collector electrode facing said layer, means for impressing an electric field between said collector electrode and said layer of such configuration that only electrons emitted from energy levels which are temperature sensitive reach said collector electrode, and means to scan said layer with a beam of photon energy great enough to produce electron emission from energy levels which are temperature insensitive.

9. An image converter comprising means for projecting an infrared radiation field onto a screen having a photoelectrically emissive surface layer, a sealed-off window transparent to radiation in the visible and in the infrared up to 14 microns, a support for said layer, a collector electrode facing said layer, means for impressing an electric field between said collector electrode and said layer of such configuration that only electrons emitted from energy levels which are temperature sensitive reach said collector electrode, a fluorescent screen, means to scan it with a beam which produces a spot thereon of photon energy great enough to produce electron emission in said layer from energy levels which are temperature insensitive, and means to focus an image of said spot on said screen.

10. An image converter comprising means for projecting an infrared radiation field onto a screen having a cesium antimony surface layer, a sealed-off window transparent to radiation in the visible and in the infrared up to 14 microns, a support for said layer, a collector electrode facing said layer, means for impressing an electric field between said collector electrode and said layer of such configuration that only electrons emitted from energy levels which are temperature sensitive reach said collector electrode, a fluorescent screen, means to scan it with a beam which produces a spot thereon emitting photons of wavelength less than 6800 Angstroms, and means to focus an image of said spot on said screen.

11. An image converter comprising a screen on which a radiation image is focussed, said screen having a cesium antimony layer, a support for said layer, a collector electrode facing said layer, means for impressing an electric field between said collector electrode and said layer of such configuration that only electrons emitted from energy levels which are temperature sensitive reach said collector electrode, a fluorescent screen, means to scan it with a beam which produces a spot thereon emitting photons of wavelength less than 6800 Angstroms, and means to focus an image of said spot on said screen.

12. An image converter comprising means for projecting an infrared radiation field onto a screen having a cesium antimony surface layer, a sealed-off window transparent to radiation in the visible and in the infrared up to 14 microns, a support for said layer, a collector electrode facing said layer, means for impressing electric fields between said collector electrode and said layer of such configuration that electrons emitted are first accelerated then deaccelerated such that only electrons emitted from energy levels which are temperature sensitive reach said collector electrode, and means to scan said layer with a beam of photon energy great enough to produce electron emission from energy levels which are temperature insensitive.

13. An image converter tube comprising a screen on which a radiation image is focussed, said screen having a photoelectrically-emissive surface layer, a support for said layer, a collector electrode facing said layer and means for impressing an electric field between said collector electrode and said layer of such configuration that only electrons emitted from energy levels which are temperature sensitive reach said collector electrode.

14. An image converter comprising means for projecting an infrared radiation field onto a screen having a cesium antimony surface layer, a sealed-off window transparent to radiation in the visible and in the infrared up to 14 microns, a support for said layer, a collector electrode facing said layer, and means for impressing an electric field between said collector electrode and said layer of such configuration that only electrons emitted from energy levels which are temperature sensitive reach said collector electrode.

15. An image converter comprising a screen on which a radiation image is focussed, said screen having a photoelectrically-emissive surface layer which has a substantial temperature-coefficient of emissivity for electrons occupying high energy levels but a different temperature coefficient of emissivity for electrons from lower energy levels, a support for said surface layer, a layer of high absorptivity for infrared radiation, means to impress a retarding field for electrons adjacent said surface layer, a collector electrode outside said retarding field, and means to scan said surface layer with a spot of light having photon energy greater than necessary to emit electrons from said high energy levels.

16. An image converter comprising means for projecting an infrared radiation field on a screen having a photoelectrically-emissive surface layer which has a substantial temperature-coefficient of emissivity for electrons held at a high energy level but a different temperature coefficient of emissivity for electrons held at a lower energy level, a sealed-off window transparent to radiation in the visible and in the infrared up to 14 microns, a support for said layer, means to impress a retarding field for electrons adjacent said layer, a collector electrode outside said retarding field, and means to scan said layer with a spot of light having photon energy greater than necessary to emit electrons from said high energy levels.

17. An image converter comprising means for projecting an infrared radiation field on a screen having a photoelectrically-emissive surface layer which has a substantial temperature-coefficient of emissivity for electrons occupying high energy levels, but a different temperature coefficient of emissivity for electrons from low energy levels, a sealed-off window transparent to radiation in the visible and in the infrared up to 14 microns, a support for said surface layer, a layer of high absorptivity for infrared radiation, means to impress a retarding field for electrons adjacent said surface layer, a collector electrode outside said retarding field, and means to scan said surface layer with a spot of light having photon energy great enough to produce emission of electrons from temperature insensitive energy levels.

18. An image converter comprising a screen on which a radiation image is focussed, said screen having a photoelectrically-emissive surface layer which has a substantial temperature-coefficient of emissivity for electrons occupying high energy levels, but a different temperature coefficient of emissivity for electrons from low energy levels, a support for said surface layer, a layer of high absorptivity for infrared radiation, means to impress a retarding field for electrons adjacent said surface layer, a collector electrode outside said retarding field, and means to scan said surface layer with a spot light having photon energy great enough to produce emission of electrons from temperature insensitive energy levels.

19. An image converter comprising a screen on which a radiation image is focussed, said screen having a photoelectrically-emissive surface layer which has a substantial temperature-coefficient of emissivity for electrons occupying high energy levels, but a different temperature coefficient of emissivity for electrons from low energy levels, a support for said layer, means to impress a retarding field for electrons adjacent said layer, a collector electrode outside said retarding field, and means to scan said layer with a spot of light having photon energy great enough to produce emission of electrons from temperature insensitive energy levels.

20. An image converter comprising a screen on which a radiation image is focussed, said screen having a photoelectrically-emissive surface layer which has a substantial temperature-coefficient of emissivity for electrons held at a high energy level but a different temperature coefficient of emissivity for electrons held at a low energy level, a support for said surface layer, a layer of high absorptivity for infrared radiation, means to impress a retarding field for electrons adjacent said surface layer, a collector electrode outside said retarding field, and means to scan said surface layer with a spot of light of wavelength less than the photoelectric threshold wavelength.

21. An image converter comprising a screen having a cesium antimony layer which has a substantial temperature-coefficient of emissivity for electrons held at a high energy level but a different temperature coefficient of emissivity for electrons held at a low energy level, a support for said layer, means to impress a retarding field for electrons adjacent said layer, a collector electrode outside said retarding field, and means to scan said layer with a spot of light of wavelength less than 6800 Angstroms.

References Cited in the file of this patent

UNITED STATES PATENTS

| | | |
|---|---|---|
| 2,195,486 | Gray | Apr. 2, 1940 |
| 2,319,195 | Morton | May 11, 1943 |
| 2,541,374 | Morton | Feb. 3, 1951 |
| 2,618,761 | Rose | Nov. 18, 1952 |